United States Patent [19]

Powell

[11] Patent Number: 4,635,369

[45] Date of Patent: Jan. 13, 1987

[54] SCRIBING DEVICE AND METHOD

[76] Inventor: Tommie L. Powell, 2000 NE. 100th St., Seattle, Wash. 98125

[21] Appl. No.: 857,130

[22] Filed: Apr. 29, 1986

[51] Int. Cl.⁴ .......................................... B43L 13/22
[52] U.S. Cl. .................... 33/27.11; 33/27.12; 33/566; 33/30.2
[58] Field of Search ............. 33/27.01, 27.11, 27.12, 33/27.08, 30.1, 30.2, 30.3, 30.6, 189, 192, 566, 42

[56] References Cited

U.S. PATENT DOCUMENTS

| | | | |
|---|---|---|---|
| 3,253,473 | 5/1966 | Chisholm | 33/27.01 |
| 3,263,516 | 8/1966 | Chisholm | 33/27.01 |
| 3,292,263 | 12/1966 | Barry et al. | 33/42 |
| 3,453,933 | 7/1969 | Kornhauser | 33/27.12 |
| 3,540,130 | 11/1970 | French | 33/174 |
| 3,741,063 | 6/1973 | Bretthauer | 83/745 |
| 3,853,161 | 12/1974 | Welgas | 144/144.5 |
| 3,858,630 | 1/1975 | Cherry et al. | 144/144 |
| 3,865,162 | 2/1975 | Schmidt | 144/144 |
| 3,881,255 | 5/1975 | Pantek | 33/27.01 |
| 3,927,477 | 12/1975 | Harris | 33/27.08 |
| 3,942,566 | 3/1976 | Schmidt | 144/144 |
| 4,044,805 | 8/1977 | Gronholz | 33/42 |
| 4,095,633 | 6/1978 | Kimball et al. | 144/144 |
| 4,131,048 | 12/1978 | Dickes | 83/745 |
| 4,248,282 | 2/1981 | Waldron et al. | 144/144 |

Primary Examiner—Willis Little
Attorney, Agent, or Firm—Christensen, O'Connor, Johnson & Kindness

[57] ABSTRACT

A scribing device and method for generating curves, the term "scribe" encompassing marking a groove on a surface such as with an awl or router, marking a surface with a writing instrument, or cutting into a surface such as with a jigsaw. In one embodiment, the scribing device comprises a generator and a scribing assembly. The generator has a generally flat, upper surface with a groove formed therein, the groove comprising one or more connected, linear or circular segments. The scribing assembly comprises a body having a lower tracing surface shaped to permit sliding movement over the upper surface of the generator. The scribing assembly also includes first and second tracers and means for mounting a scribing instrument. Each tracer includes a follower projecting downward from the tracing surface, and each follower is adapted to slide along the groove. The scribing assembly is moved such that the followers follow the groove, whereby the scribing instrument scribes the curve. The generator may include first and second grooves that are followed by the first and second followers, respectively. The groove or grooves may also be cut directly into the upper surface of a workpiece that is to be scribed.

10 Claims, 11 Drawing Figures

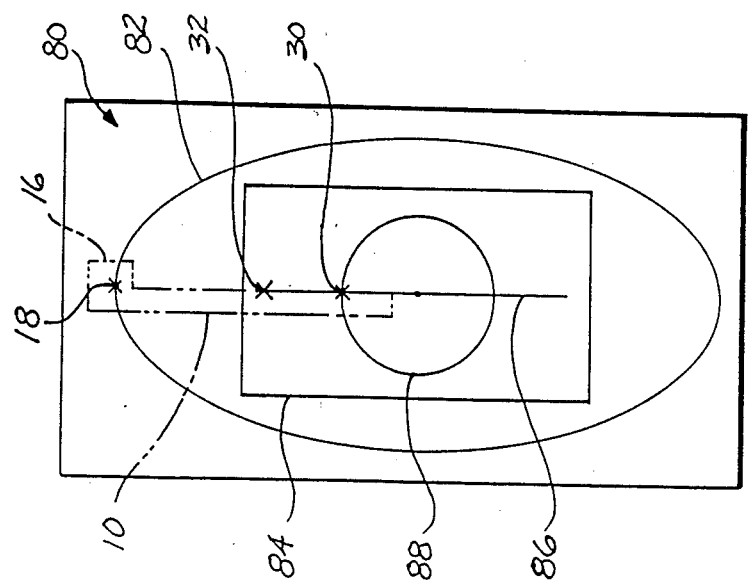
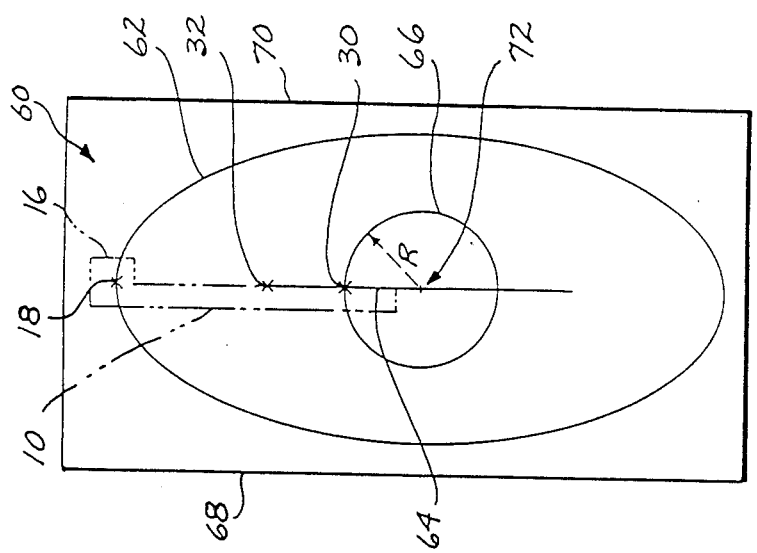

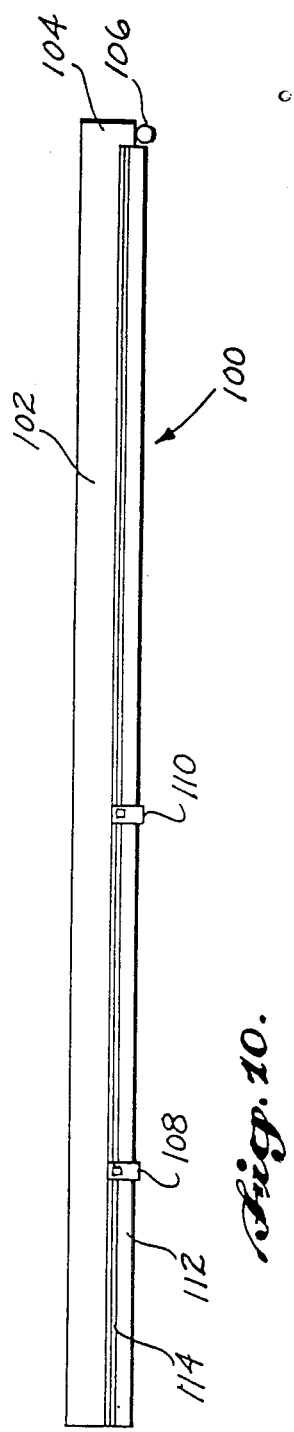
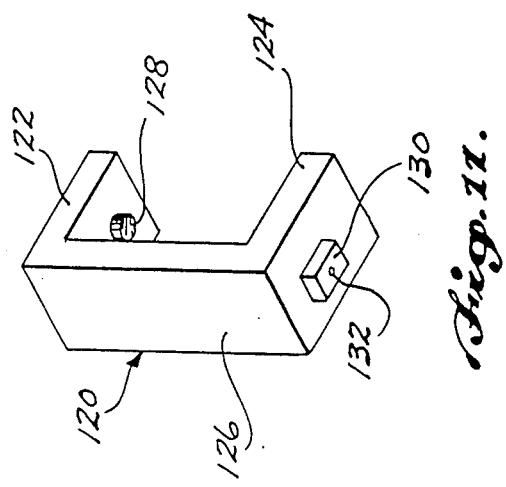

SCRIBING DEVICE AND METHOD

FIELD OF THE INVENTION

The present invention relates to a device and a method for scribing complex curves on or in a surface. As used herein, the term "scribe" encompasses marking a groove on a surface, such as with an awl or router, marking a surface with a pen or similar instrument, or cutting into a surface such as with a jigsaw.

BACKGROUND OF THE INVENTION

The scribing of straight lines or arcs of circles on sheet material can readily be accomplished using straight edges and compasses, respectively. However, the scribing of more complex shapes has generally required either a tracing device or its equivalent. Tracing devices have the inherent limitation that they are not adjustable, i.e., modification of the shape or scale of a complex curve requires a separate or modified tracing device. The creation of complex shapes, such as in woodworking, would be significantly enhanced if a versatile scribing device were available that was capable of scribing a wide range of complex curves such as ellipses, parabolas and hyperbolas.

SUMMARY OF THE INVENTION

The present invention provides a scribing device and method for generating an essentially unlimited variety of curves. In one preferred embodiment, the scribing device of the present invention comprises a generator and a scribing assembly. The generator has a generally flat upper surface and a groove formed in the upper surface. The groove comprises one or more connected segments, each segment being either linear or circular. The scribing assembly comprises a body having a lower tracing surface shaped so as to permit the tracing surface to slide over the upper surface of the generator. The scribing assembly also includes first and second tracers and means for mounting a scribing instrument. Each tracer includes a follower projecting downward from the tracing surface, and each follower is adapted to slide along the groove. In accordance with the method of the present invention, the scribing assembly is moved such that the followers follow the groove while the scribing instrument mounted to the scribing assembly scribes the desired curve.

In a second preferred embodiment, the upper surface of the generator includes first and second grooves formed therein, and the first and second followers are caused to follow the first and second grooves, respectively. In another embodiment, the generator is not used, and the groove or grooves are cut directly into the upper surface of the workpiece.

BRIEF DESCRIPTION OF THE DRAWINGS

FIG. 6 is a schematic view showing the scribing of an elliptical curve using the scribing device of the present invention in conjunction with two grooves;

FIG. 7 is a schematic view showing the generation of an elliptical curve using a curve generator positioned on a workpiece;

FIG. 10 is a top plan view of a second preferred embodiment of the scribing device of the present invention; and FIG. 11 is a perspective view of a second embodiment of a tracer.

DETAILED DESCRIPTION OF THE INVENTION

Figure 1:
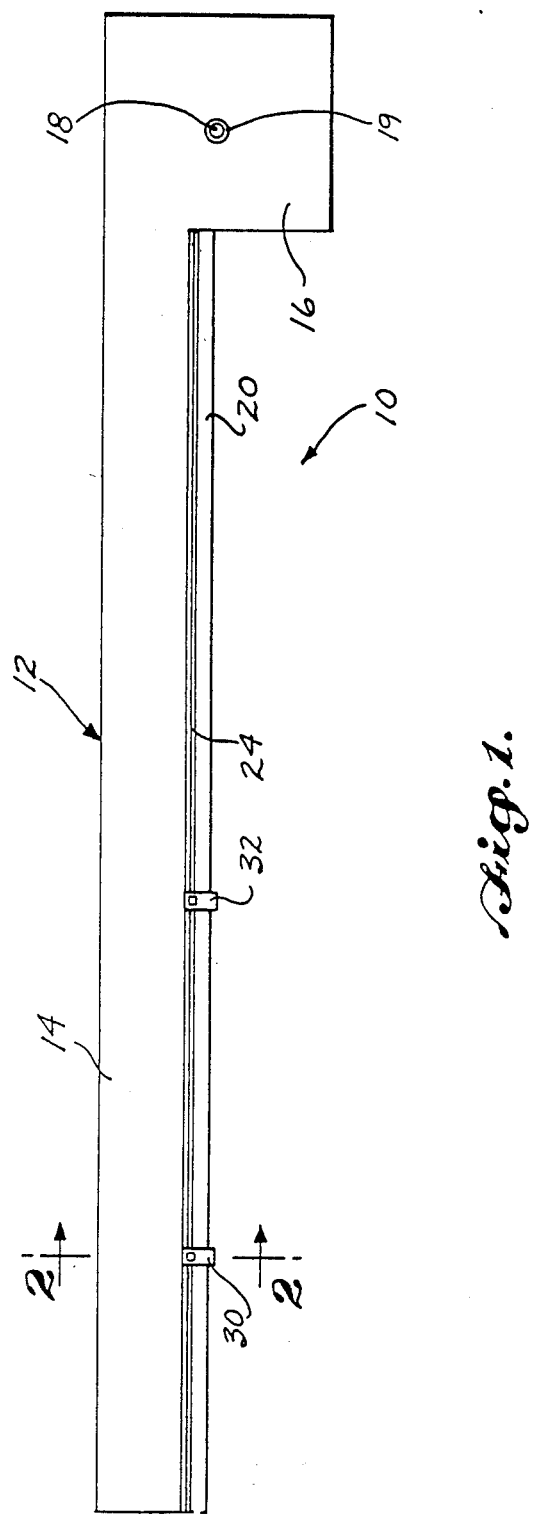
FIG. 1 is a top plan view of a preferred embodiment of the scribing device of the present invention.
Figure 2:
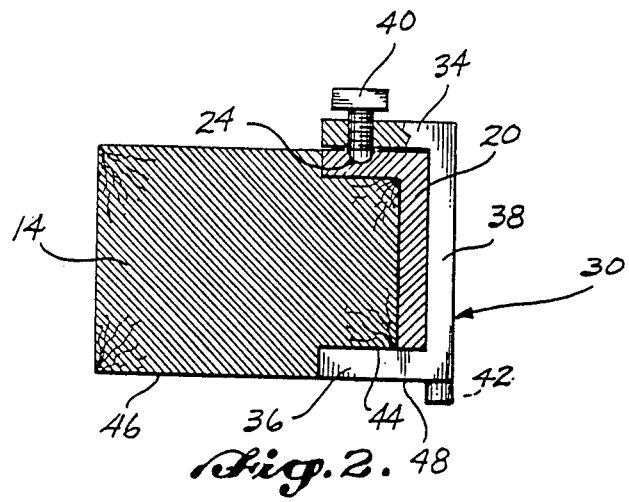
FIG. 2 is a cross-sectional view taken along the line 2—2 of FIG. 1.
Figure 3:
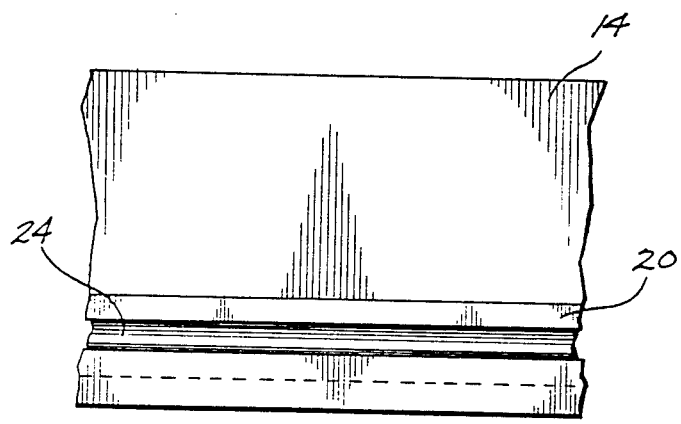
FIG. 3 is a top plan view of a portion of the scribing device of FIG. 1.
Figure 4:
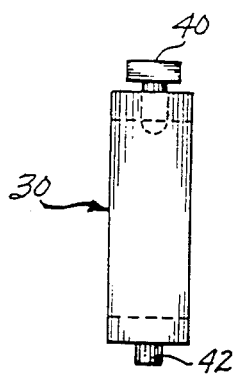
FIG. 4 is a side elevational view of a tracer.

FIGS. 1-5 illustrate one preferred embodiment of a scribing device according to the present invention. The scribing device 10 comprises body 12 that includes arm 14 and mounting pad 16 formed at one end of arm 14. Mounting pad 16 includes opening 18 that is formed by plastic tube 19 that extends through and is secured in the mounting pad. The mounting pad is used to mount a router, jigsaw or similar tool. The router or jigsaw is positioned on the upper surface of mounting pad 16, such that the router bit or jigsaw blade projects downward through the tracing device through opening 18. Scale 20 is mounted along the full length of one side of arm 14, the scale having the shape of an upside-down L, as best indicated in FIG. 2.

Figure 5:
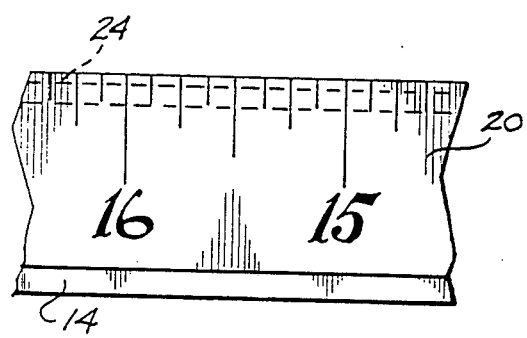
FIG. 5 is a side elevational view of a portion of the scribing device showing the scale.

As illustrated in FIG. 5, the lateral, exterior surface of scale 20 includes conventional distance measuring marks. Such marks preferably indicate the distance between a given mark and opening 18, opening 18 being positioned such that it would be intersected by the continuation of scale 20. Groove 24 runs along the upper surface of scale 20 for the full length of the scale. Preferred materials for body 12 and scale 20 are wood and plastic respectively. The scale may be secured to the body by adhesive or any other suitable means.

The scribing device of FIGS. 1-5 further includes tracers 30 and 32, each tracer being movable along arm 14 and including means for locking the tracer in a selected position along the length of the arm. Tracer 30 includes upper member 34 and lower member 36 interconnected by side member 38. Upper member 34 includes an internally threaded opening into which machine screw 40 is threaded. The position of the opening in upper member 34 is such that the tip of screw 40 is received in groove 24 when the tracer is positioned over the side of arm 14, as illustrated in FIG. 2. Thus the tracer may be secured in position along the length of arm 14 by tightening screw 40. When the tracer is so positioned, lower member 36 projects into a recess 44 formed in lower surface 46 of arm 14, such that lower surface 48 of the tracer is continuous with lower surface 46. Cylindrical pin 42 extends downward from lower surface 48 directly beneath side member 38. Other pin shapes may also be used, as described below. For the purpose of the present description, it will be assumed that tracer 32 is identical to tracer 30. Pins 42 of tracers 30 and 32 and opening 18 in mounting pad 16 will hereafter be referred to as functional points of scribing device 10.

The use of the scribing device of the present invention is illustrated in FIG. 6. FIG. 6 shows sheet 60 of wood or other material, in which it is desirable to scribe (e.g., to rout or cut) along elliptical curve 62, which elliptical curve is to have a width of 4 R and a length of 8 R. In order to scribe along curve 62 using the scribing device of FIGS. 1-5, linear groove 64 and circular groove 66 are first cut into the upper surface of sheet 60. Linear groove 64 is cut parallel to side edges 68 and 70 of sheet 60 for a total length of 4 R, such that the midpoint of groove 64 conicides with the desired center point 72 of elliptical curve 62. Circular groove 66 is cut such that it has a radius of R and a center at point 72. The scribing device of the present invention is then adjusted such that the functional point of tracer 30 is positioned at a distance of 3 R from opening 18, and such that the functional point of tracer 32 is positioned a distance R from the functional point of tracer 30 and a distance of 2 R from opening 18. The functional points of a tracer are measured from the central axis of cylindrical pin 42 shown in FIGS. 2 and 4. Once the tracers are locked in these positions by tightening screws 40, the scribing device is positioned as indicated in phantom lines in FIG. 6, with the pin of tracer 30 extending into circular groove 66 at the intersection between grooves 64 and 66, and with the pin of tracer 32 extending into linear groove 64 at the extreme upper end of that groove. The router, jigsaw or other tool positioned on mounting pad 16 is then activated, and scribing device 10 is then moved such that the pin of tracer 30 follows circular groove 66, while the pin of tracer 32 follows linear groove 64. As a result of such a movement, functional point 18 will follow elliptical curve 62. The router, jigsaw or other tool at functional point 18 will therefore scribe elliptical curves 62 in sheet 60.

In the embodiment shown in FIGS. 1-5, pins 42 of tracers 30 and 32 and opening 18 in mounting pad 16 are positioned along a straight line with respect to one another, and the tracers are adjustable along elongated arm 14. However, it is not necessary for the present invention for the functional points to be colinear, or for the tracers to be positioned along an elongated member. However, the arrangement shown in FIGS. 1-5 is generally preferred, inasmuch as it makes it easy to calibrate the scribing device to produce a desired curve, and also provides a compact and portable device.

For many applications, it will be undesirable to form a groove in the upper surface of a workpiece, such as sheet 60 shown in FIG. 6. In such a situation, the arrangement shown in FIG. 7 may be used. In FIG. 7, the workpiece comprises sheet 80, in which elliptical curve 82 is to be scribed. To scribe curve 82 without first forming grooves in the upper surface of sheet 80, curve generator 84 is securely positioned on the surface of sheet 60. Curve generator 84 comprises a sheet of any suitable material in which linear groove 86 and circular groove 88 have been cut. Grooves 86 and 88 are identical to grooves 64 and 66 respectively of FIG. 6, and the operation of scribing device 10 is identical to that described above with respect to FIG. 6. For this application, the router bit or jigsaw blade may either be allowed to project downward from mounting pad 16 to the surface of sheet 80 or, preferably, tube 19 (see FIG. 1) can be extended below the lower surface of mounting pad 16 for a distance equal to the thickness of curve generator 84.

Figure 8:
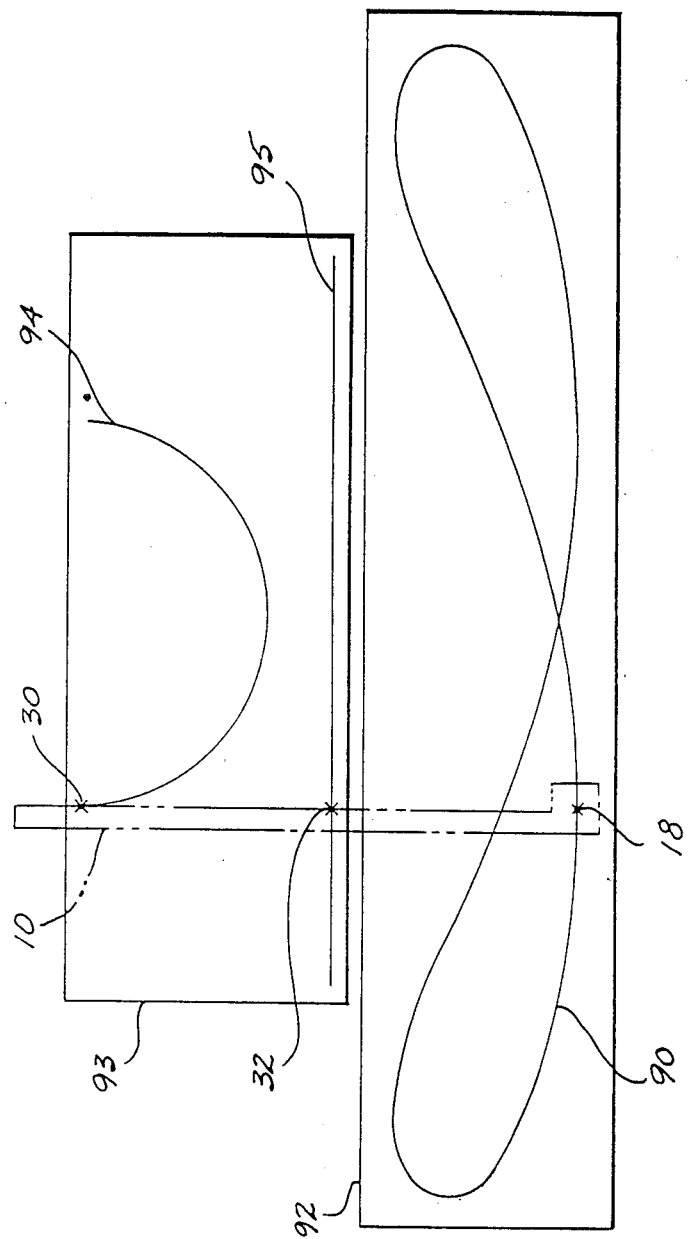
FIG. 8 is a schematic view showing the generation of a curve of hyperbolic segments using a curve generator positioned beside a workpiece.

For many applications where it will be undesirable to form a groove or pair of grooves in the upper surface of a workpiece, it may also be impractical or undesirable to position a curve generator on the workpiece. In such a situation, a curve generator may be securely positioned beside the workpiece and approximately at the level of the upper surface of the workpiece, as shown in FIG. 8. In FIG. 8, curve 90 is composed of hyperbolic segments and is to be scribed on workpiece 92. Curve generator 93 has a semicircular groove 94 convex to straight groove 95. The distance between the tracers 30 and 32 is equal to the perpendicular distance from straight groove 95 to either end of semicircular groove 94.

Figure 9:
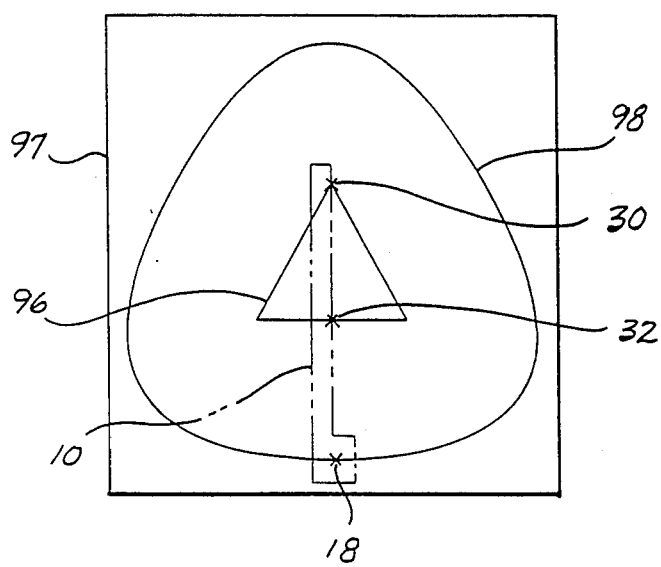
FIG. 9 is a schematic view showing the generation of a curve of parabolic segments using a single groove.

FIG. 9 illustrates an application in which tracers 30 and 32 follow the same groove. Groove 96 in workpiece 97 has end joined straight segments arranged in the shape of an equilateral triangle whose altitude is equal to the distance between the tracers. Curve 98 is to be scribed, and consists of parabolic segments.

A second embodiment of the present invention is illustrated by scribing device 100 shown in FIG. 10. Scribing device 100 includes arm 102, end portion 104, clip 106 and tracers 108 and 110. Arm 102 may be identical to arm 14 of the embodiment of FIGS. 1-5, and may include scale 112 having groove 114 format therein. Tracers 108 and 110 may also be identical to tracers 30 and 32 respectively of FIG. 1. However, in scribing device 100, the mounting pad has been replaced by end portion 104 and clip 106. Clip 106 may be a conventional device of the kind used on compasses for locking a pencil or other writing instrument in place. Such a clip consists of a cylinder through which a pencil or pen may be inserted, a locking mechanism for clamping the scribing instrument in place. End portion 104 simply provides a mounting for clip 106, and may be fabricated as an extension of arm 102. Scribing device 100 is used in a manner identical to that of scribing device 10 shown in FIGS. 1-7, except that the functional point corresponding to opening 18 in FIG. 1 is now the center of clip 106, and except that a pencil, pen, awl or similar instrument is used in place of a router or jigsaw.

A great variety of curves can be readily produced by the scribing device of the present invention. When the two tracers follow the same straight groove or parallel straight grooves, the scriber scribes a straight line. When the two tracers follow the same circular groove or concentric or equal radius circular grooves, the scriber scribes a circular line. When the two tracers follow separate, nonparallel straight grooves, the scriber scribes a parabolic line. When either tracer follows a straight groove as the other follows a circular groove concave to that straight groove, the scriber scribes an elliptical line. When either tracer follows a straight groove as the other tracer follows a circular groove convex to that straight groove, the scriber scribes a hyperbolic line. By varying the spacing, length and radius of curvature of the grooves, an essentially endless variety of curves can be scribed. Grooves can also consist of straight and/or circular end joined segments, from which can be scribed curves composed of end joined straight, circular, parabolic, elliptical or hyperbolic segments.

For all embodiments, it is preferable that the lower surface of the scribing device be a flat surface, except possibly under mounting pad 16, in order that the scribing device may move smoothly over the upper surface of the workpiece or curve generator. The functional points of the tracers and of the scribing tool, of course, extend below the surface of the scribing device. Wobbling of the tracer pins in the grooves is prevented by making the grooves slightly wider than the tracer pins, so that the pins will fit snugly, but not tightly, in the grooves, and hence can slide but not wobble.

For many embodiments in which two different grooves are used, the grooves will not intersect. However, if the grooves do intersect, as illustrated for example in FIGS. 6 and 7, then it may be desirable to provide two different types of pins of functional points for the two tracers. In particular for a circular groove, cylindrical pin 42 shown in FIGS. 2 and 5 is appropriate. However, for a straight groove, tracer 120 shown in FIG. 11 may be used. Tracer 120 comprises upper member 122 and lower member 124 joined by side member 126. Upper member 122 includes an internally threaded opening in which machine screw 128 is threaded. However, in this embodiment, cylindrical pin 42 has been replaced by block 130 that is mounted for rotational movement about pivot 132 that extends downward from the body of the tracer 120. The pivotal mounting of block 130 permits rotation of the tracer and scribing device with respect to the linear groove in which the block moves, while the rectangular shape of block 130 prevents it from following a curved or otherwise nonlinear groove. In some embodiments, it may be desirable to make the height of block 130 different from the height of pin 42, and to make the corresponding grooves of different depths, to prevent a tracer from following the wrong groove.

While the preferred embodiments of the invention have been illustrated and described, it is to be understood that variations will be apparent to those skilled in the art. The invention is therefore not to be limited to the specific embodiments described above, but the true scope and spirit of the invention is instead to be determined by reference to the following claims.

The embodiments of the invention in which an exclusive property or privilege is claimed are defined as follows:

1. A scribing device, comprising:
   a generator having a generally flat upper surface and a groove formed therein, the groove comprising one or more connected segments, each segment being either linear or circular; and
   a scribing assembly comprising a body having a lower tracing surface shaped so as to permit the tracing surface to slide over the upper surface of the generator, means for mounting a scribing instrument, and first and second tracers, each tracer including a follower projecting downward from the tracing surface, each of the followers being adapted to slide along the groove.

2. The scribing device of claim 1, wherein each tracer includes means for securing the tracer at a selectable position on the body, such that the distance between each follower and the scribing instrument can be adjusted.

3. The scribing device of claim 1, wherein the upper surface of the generator has first and second grooves formed therein, each groove comprising one or more connected segments, each segment being either linear or circular, and wherein the first tracer includes a first follower projecting downward from the tracing surface and the second tracer includes a second follower projecting downward from the tracing surface, the first and second followers being adapted to slide along the first and second grooves, respectively.

4. A scribing device for use with a workpiece having a generally flat upper surface and a groove formed therein, the groove comprising one or more connected segments, each segment being either linear or circular, the scribing device comprising a scribing assembly including a body having a lower tracing surface shaped so as to permit the tracing surface to slide over the upper surface of the workpiece, means for mounting a scribing instrument, and first and second tracers, each tracer including a follower projecting downward from the tracing surface, each follower being adapted to slide along the groove.

5. The scribing device of claim 4, wherein each tracer includes means for securing the tracer at a selectable position on the body, such that the distance between each follower and the scribing instrument can be adjusted.

6. The scribing device of claim 4, wherein the upper surface of the workpiece has first and second grooves formed therein, each groove comprising one or more connected segments, each segment being either linear or circular, and wherein the first tracer includes a first follower projecting downward from the tracing surface and the second tracer includes a second follower projecting downward from the tracing surface, the first and second followers being adapted to slide along the first and second grooves, respectively.

7. A method of scribing a curve in a workpiece having a generally flat upper surface, the method comprising:
   forming a groove in the upper surface of the workpiece, the groove comprising one or more connected segments, each segment being either linear or circular;
   providing a scribing assembly comprising a body having a lower tracing surface shaped to it to permit the tracing surface to slide over the upper surface of the workpiece, means for mounting a scribing instrument, and first and second tracers, each tracer including a follower projecting downward from the tracing surface, each follower being adapted to slide along the groove; and
   moving the scribing assembly such that the followers slide along the grooves while the scribing instrument scribes said curve.

8. A method of scribing a curve in a workpiece having a generally flat, upper surface, the method comprising:
   positioning a generator at a fixed location in relation to the workpiece, the generator having an upper surface in which a groove is formed, the groove comprising one or more connected segments, each segment being either linear or circular;
   providing a scribing assembly comprising an elongated member having a lower tracing surface adapted to permit the tracing surface to slide over the upper surface of the generator, means for mounting a scribing instrument, and first and second tracers, each tracer including a follower projecting downward from the tracing surface, each follower being adapted to slide along the groove; and
   moving the scribing assembly such that the followers slide along the groove while the scribing instrument scribes said curve.

9. A method of scribing a curve in a workpiece having a generally flat upper surface, the method comprising:

forming first and second grooves in the upper surface of the workpiece, each groove comprising one or more connected segments, each segment being either linear or circular;

providing a scribing assembly comprising a body having a lower tracing surface adapted to permit the tracing surface to slide over the upper surface of the workpiece, means for mounting a scribing instrument, and first and second tracers, each tracer including a follower projecting downward from the tracing surface, the first and second followers being adapted to slide along the first and second grooves, respectively; and moving the scribing assembly such that the first and second followers slide along the first and second grooves respectively while the scribing instrument scribes said curve.

10. A method of scribing a curve in a workpiece having a general flat upper surface, the method comprising:

positioning a generator at a fixed location in relation to the workpiece, or approximately at the level of the upper surface of the workpiece, the generator having an upper surface in which first and second grooves are formed, each groove comprising one or more connected segments, each segment being either linear or circular;

providing a scribing assembly comprising a body having a lower tracing surface adapted to permit the tracing surface to slide over the upper surface of the generator, means for mounting a scribing instrument, and first and second tracers, each tracer including a follower projecting downward from the tracing surface, the first and second followers being adapted to slide along the first and second grooves, respectively; and moving the scribing assembly such that the first and second followers slide along the first and second grooves respectively while the scribing instrument scribes said curve.

* * * * *